Sept. 18, 1923.

T. M. AVERY 1,468,097

ANTISKID ATTACHMENT FOR WHEELS

Filed Feb. 10, 1917

Witness
C. L. Kesler
Chas. S. Hyer.

Inventor
True M. Avery
By James L. Norris,
Attorney

Patented Sept. 18, 1923.

1,468,097

UNITED STATES PATENT OFFICE.

TRUE M. AVERY, OF GLENS FALLS, NEW YORK, ASSIGNOR TO ARROW-GRIP MANUFACTURING CO., INC., OF GLENS FALLS, NEW YORK, A CORPORATION OF NEW YORK.

ANTISKID ATTACHMENT FOR WHEELS.

Application filed February 10, 1917. Serial No. 147,256.

*To all whom it may concern:*

Be it known that I, TRUE M. AVERY, a citizen of the United States, residing at Glens Falls, in the county of Warren and State of New York, have invented new and useful Improvements in Antiskid Attachments for Wheels, of which the following is a specification.

This invention relates to improvements in anti-skid devices for use in connection with the tires of motor trucks, proposing a device for attachment to the wheel for the secure anchorage of the anti-skid element, i. e. the cross chain.

The objects of the invention, briefly stated, are to provide a device which greatly facilitates the attachment and removal of the cross chains, whose chain securing means may be arranged well inward of the side of the felly so as not to catch against obstructions closely adjacent the wheel, which effects an exceedingly strong and secure anchorage of the cross chains under the most severe conditions of use and without requiring modification, or impairing the strength of or causing injury to the wheel structure, which avoids all possibility of loss of the chain securing means, which shall be of very simple construction and of great strength for the purposes in view, which may be manufactured at relatively low cost, and which may be quickly and easily applied to the wheel.

With the above objects in view the invention consists of certain novel features of structure, combination and relation which will be set forth in detail as the description proceeds.

An embodiment of the invention is illustrated in the accompanying drawing, wherein.

The device includes a plate upon which the chain terminal securing elements are mounted and means for attaching said plate to a wheel adjacent the felly. The chain terminal securing means preferably includes a movably mounted part and other parts with which said movably mounted part has common co-operation simultaneously to lock or release both terminals of the chain to be secured. According to one feature of the invention the relation among said plate, the chain terminal securing means and the means for attaching said plate to the wheel is such that in the attached relation of said plate said movably mounted part will lie substantially in the common plane of the spokes.

In the construction preferred and with reference to certain features of the invention as will hereafter be pointed out the device includes a clamp to take over a spoke and one member of said clamp, constituting the aforesaid plate, carries the chain terminal securing means in novel and advantageous relations to the clamp and to the wheel.

Figure 2:
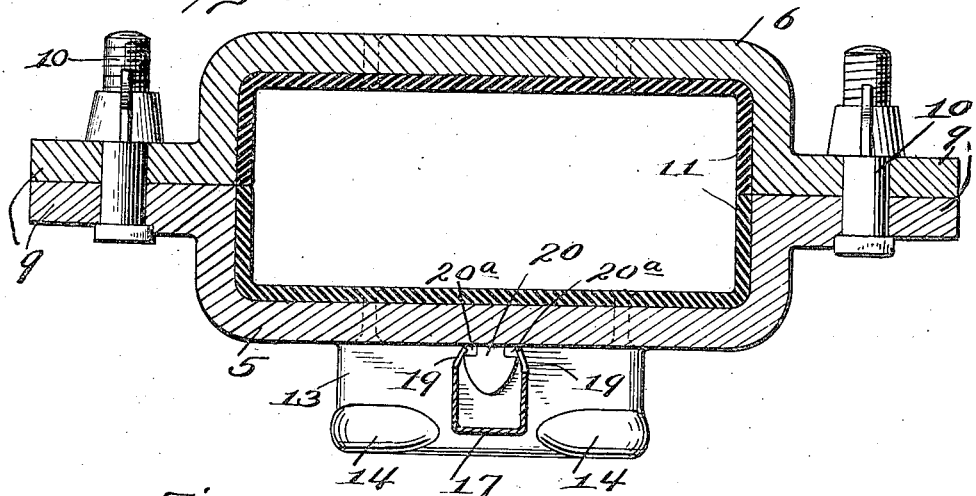
Figure 2 is a horizontal sectional view of the device.

The numerals 5 and 6 designate clamping members shaped to embrace a spoke 7 extending from a wheel rim 8, the clamping members being provided with end ears or lugs 9 which are separably connected by a bolt 10, as clearly shown by Figure 2. The clamping members 5 and 6 are also provided with a lining 11, preferably of rubber, so as to avoid injury to the portion of the spoke 7 engaged thereby. The clamp composed of the members 5 and 6 is preferably located adjacent the rim 8, which is shown as carrying a solid rubber tire 12, particularly adapted for use with a heavy motor vehicle.

As regards an important feature of the invention the clamp members 5 and 6, which together conform to the spoke, are disposed transversely thereof and are connected together at the sides of the spoke; and one of said clamp members, e. g. the member 5, which, in the embodiment disclosed, constitutes the aforesaid plate, carries the means for securing the ends of the cross chain and has said means located between the spokes and substantially inward of the sides of the felly and of the connections 10, the relation being such that the opposing stresses or pulls of the cross chain are without effect on the security of the clamp as fitted to the spoke. As regards another important feature of the invention the chain securing means has elements in co-operation with a web or flange which projects from the adjacent clamp member, in overhanging relation to the felly and in a plane substantially normal to the axis of the clamp, and which sustains the opposite pull of the cross chain, whereby such pull will not be substantially directed against the clamps or spokes, said web or flange preferably having a bearing against the felly.

Figure 3:
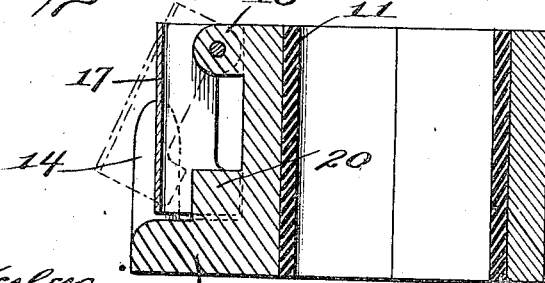
Figure 3 is a vertical sectional view of the device in a plane which coincides with the substantially central plane of the wheel to which the device is fitted.

As regards the specific construction disclosed as a preferred embodiment of the invention and as having incorporated therein the features above pointed out, the clamp member 5 is provided with the projecting web or flange 13 having oppositely disposed hooks 14, which are directed inward toward each other, preferably occupying a common plane, and in the attached relation of the clamp are disposed transversely of the common plane of the spokes. The hooks have their terminals spaced apart a sufficient distance to provide a passage for the end links 15 of a cross chain 16, said links being engaged with said hooks when the device is in use, and by virtue of the arrangement of the hooks in a plane transverse to the common plane of the spokes and on a part, i. e. the web 13 which overhangs the felly and occupies a plane substantially normal to the axis of the clamp, the pull of the cross chain will be taken by said part and will not be substantially exerted against the clamps or the spokes. The web 13, with the hooks 14, practically forms an open link in connection with the clamp member 5, and in the embodiment under consideration the chain securing means is completed by an element which co-operates with the hooks 14 to prevent the accidental disengagement of the terminal links or other devices of the cross chain 16 and which preferably consists of a pivoted keeper 17 movable in a direction of the common plane of the spokes and similarly related to both hooks. The keeper 17 when constructed as herein shown forms an element of a latch in which certain features of the invention are embodied. Said keeper is mounted upon an ear or projection 18 centrally located with respect to the web 13 and adjacent to the edge of the clamp member 5 opposite that from which the said web projects, as clearly shown by Figure 3. As shown the keeper 17 is of channeled or U-shaped cross section, thereby being in the form of a hollow box-like structure rectangular in contour. The sides of the keeper overlie the sides of the projection 18 and are formed with apertured ears for the connecting pivot pin. The keeper has its greatest dimension in a direction taken radially or substantially so of its pivot and at its free end has laterally acting spring lips or catches 19 formed at the inner edges thereof and somewhat sharply bent relatively inward, that is to say in converging relation beyond the planes of its side walls. The lips 19 are relatively long in the direction of the longer edges of the side walls of the keeper and are relatively short in a direction at right angles to said longer edges and have securing co-operation with a lug 20 integrally formed with the web 13. The lug 20 has a maximum width greater than the normal distance between the longer edges of said lips and in plan has the substantial outline of an arrow head, being provided with lateral shoulders and opposite side recesses 20$^a$ behind said shoulders and into which the lips 19 spring when the keeper 17 is closed to hold the same against accidental displacement. Clearances are provided between the edges of the keeper and the clamp member 5, such clearances being delimited by the side edges of the keeper extending between the lips 19 and the pivoted lugs at the end of the keeper opposite said lips. Any suitable implement may be inserted through the clearances for the purpose of manipulation against the clamp member 5 and against the keeper to move the latter to open position against the resistance offered by the engagement of the lips 19 with the lug 20.

Figure 1:
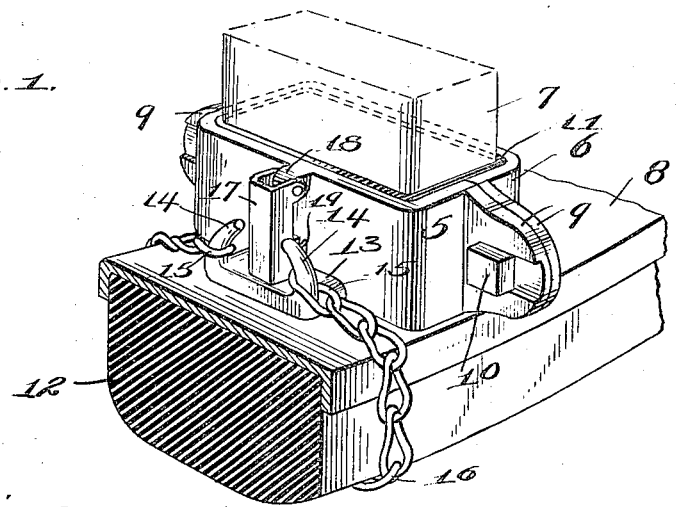
Figure 1 is a perspective view of a device in which the features of the invention are incorporated and showing said device as fitted to the spoke of a wheel and as securing the cross chain in relation to the tire, the construction shown in this figure being preferred.

In the operation of the device the keeper 17, which also acts as a partial closure relatively to the space between the terminals of the hooks 14, is opened by drawing the same outward and by disengaging the spring lips or catches 19 from the opposite sides of the lug 20 and clearing the common throat or space between the terminals of the hooks 14. After the terminal links 15 or other attaching devices of the cross chain or non-skid element 16 are engaged with relation to the hooks 14 the keeper 17 is moved inward to the full extent and the lips or catches 19 spring over and engage the recesses 20$^a$ at the opposite sides of the lug 20 close to the adjacent face of the clamp member 5. When the keeper 17 is closed as shown by Figure 1 it substantially bridges the space between the terminals of the hooks 14, whereby the links 15 or other chain attaching devices that may be used are positively held against accidental disengagement from said hooks.

What is claimed as new is:

1. A device for the attachment of anti-skid chains to wheels comprising a plate, means associated with said plate for attaching the same to a wheel adjacent the felly and a chain terminal securement means carried by said plate and including a movably mounted part arranged to lie substantially in the common plane of the spokes, in the attached relation of said plate, and other parts with which said movably mounted part has common co-operation simultaneously to lock or release both terminals of the chain to be secured.

2. A device for the attachment of anti-skid chains to wheels comprising a clamp for attachment to a wheel spoke and consisting of members disposed transversely of said spoke, one of said members being provided with outstanding chain terminal securing means to sustain the pull of the anti-skid chain in opposite directions and including a single centrally located part arranged to lie in the common plane of the spokes, in the attached relation of said clamp, and movable in a direction of said plane, and other parts with which said movable part has common co-operation simultaneously to lock or release both terminals of the chain to be secured.

3. A device for the attachment of anti-skid chains to wheels comprising a plate, means associated with said plate for attaching the same to a wheel adjacent the felly and a chain terminal securement means carried by said plate and including a pair of hooks having their ends in adjacency thereby to delimit a single passage through which the chain links to be engaged may be moved, said hooks being arranged whereby, in the attached relation of said plate, their adjacent ends are in a plane at one side of the adjacent spoke and transverse to the common plane of the spokes and means having common co-operation with said hooks for opening or closing said passage.

4. A device for the attachment of anti-skid chains to wheels comprising a plate, means associated with said plate for attaching the same to a wheel adjacent the felly and a chain terminal securement means carried by said plate and including a pair of hooks whose terminals are in spaced relation, said hooks being arranged whereby, in the attached relation of said plate, their ends are in a plane transverse to the common plane of the spokes, and a keeper movable in a direction of said common plane of the spokes into and from the space between the terminals of said hooks and having common co-operation with said hooks, thereby simultaneously to lock or release both terminals of the chain to be secured.

5. A device for the attachment of anti-skid chains to wheels comprising a pair of clamp members for arrangement transversely over a spoke and together conforming thereto, said members having their ends connected together at the sides of the spoke, and a pair of chain link securing hooks carried by one of said members to sustain the pull of the anti-skid chain in opposite directions, said hooks being disposed between adjacent spokes and transversely thereof with their terminals in adjacency to delimit a single passage through which the chain links to be secured or disengaged may be moved.

6. A device for the attachment of anti-skid chains to wheels comprising a clamp for attachment to a wheel spoke and having its members disposed transversely of said spoke and one of its members provided with a projecting web which, in the attached relation of said clamp, has a bearing against the felly and chain terminal securing means in co-operation with said web, whereby the latter will sustain the opposite pull of the anti-skid chain.

7. A device for the attachment of anti-skid chains to wheels comprising a clamp for attachment to a wheel spoke and having its members disposed transversely of said spoke and one of its members provided with a web which projects in a plane normal to the axis of the clamp and, in the attached relation of the clamp, overhangs the felly, and a pair of opposed hooks mounted upon said web whereby in the attached relation of said clamp said hooks will be disposed between adjacent spokes with their ends in a plane transverse to the common plane of the spokes, and the web will sustain the opposite pull of the anti-skid chains.

8. A device for the attachment of anti-skid chains to wheels comprising a pair of clamp members for arrangement transversely over a spoke and together conforming thereto, said members having their ends connected together at the sides of the spokes and a chain link securement means carried by one of said members between its end connections with the other member to sustain the pull of the anti-skid chain in opposite directions and arranged to overhang the felly and to lie between the adjacent spokes and inward of the sides of the felly, said means having cooperating elements, one of which may be manipulated to provide for the opening or the closure of said means.

9. A device for the attachment of anti-skid chains to wheels comprising a clamp for attachment to a wheel spoke and having its members disposed transversely of said spoke and one of its members provided with a web which projects in a plane substantially normal to the axis of the clamp and in the attached relation of said clamp overhangs the felly, a pair of opposed hooks mounted upon said web whereby in the attached relation of said clamp said hooks will be disposed between the adjacent spokes with their ends in a plane transverse to the common plane of the spokes and the web will sustain the opposite pull of the anti-skid chain, the adjacent ends of said hooks delimiting a passage through which the chain links to be secured or disengaged may be moved, and an element movable relatively to the hooks in the direction of the common plane of the spokes for normally closing said passage.

10. A device for the attachment of anti-skid chains to wheels comprising a pair of clamp members for arrangement transversely over a spoke and together conforming thereto, said members having their ends connected together at the sides of the spoke, and a pair of chain link securing hooks carried by one of said members to sustain the pull of the anti-skid chain in opposite directions, said hooks being disposed between adjacent spokes and transversely thereof with their terminals in adjacency to delimit a single passage through which the chain links to be secured or disengaged may be moved, and a pivoted keeper carried by the clamp member which carries said hooks and movable relatively thereto to open or close said passage.

11. A device for the attachment of anti-skid chains to wheels comprising a clamp for attachment to a wheel spoke and having its members disposed transversely of said spoke and one of its members provided with a web which projects in a plane substantially normal to the axis of the clamp, in the attached relation of said clamp, and overhangs the felly, a pair of opposed hooks mounted upon said web whereby in the attached relation of said clamp said hooks will be disposed between the adjacent spokes with their ends in a plane transverse to the common plane of the spokes and the web will sustain the opposite pull of the anti-skid chain, the adjacent ends of said hooks delimiting a passage through which the chain links to be secured or disengaged may be moved, a pivoted keeper mounted upon the clamp member which carries said web and movable in the direction of the plane of the spokes into said passage normally to close the same, and companion coacting parts on said keeper and clamp member for holding the keeper against accidental displacement from its closed position.

12. A device for the attachment of anti-skid chains to wheels comprising a pair of clamp members for arrangement transversely over a spoke and together conforming thereto, said members having their ends connected together at the sides of the spokes and a chain link securement means carried by one of said members between its end connections with the other member to sustain the pull of the anti-skid chain in opposite directions and arranged to overhang the felly and to lie between the adjacent spokes and inward of the sides of the felly, said securement means having a part in common securing co-operation with the terminal links of the anti-skid chain and which may be manipulated to release said links.

13. A device for the attachment of anti-skid chains to wheels comprising a pair of clamp members for arrangement transversely over a spoke and together conforming thereto, said members having their ends connected together at the sides of the spokes and a chain link securement means carried by one of said members between its end connections with the other member to sustain the pull of the anti-skid chain in opposite directions and arranged to overhang the felly and to lie between the adjacent spokes and inward of the sides of the felly, said securement means including a pair of opposed hooks disposed in a common plane transverse to the common plane of the spokes.

14. A device for the attachment of anti-skid chains to wheels comprising a clamp for attachment to a wheel spoke and having its members disposed transversely of said spoke and one of its members provided with a web which projects in a plane substantially normal to the axis of the clamp and, in the attached relation of said clamp, overhangs the felly and chain terminal securing means in co-operation with said web whereby the latter will sustain the opposite pull of the anti-skid chain.

15. A device for the attachment of anti-skid chains to wheels comprising a clamp for attachment to a wheel spoke and having its members disposed transversely of said spoke and one of its members provided with a web which projects in a plane substantially normal to the axis of the clamp and, in the attached relation of said clamp, overhangs and bears against the felly, and chain terminal securing means in cooperation with said web whereby the latter will sustain the pull of the anti-skid chain.

16. A device for the attachment of anti-skid chains to wheels comprising a pair of clamp members for arrangement transversely over a spoke and together conforming thereto, said members having their ends connected together at the sides of the spoke, and a chain link securement means carried by one of said members between its end connections with the other member to sustain the pull of the anti-skid chain and arranged to overhang the felly and to lie between the adjacent spokes and inward of the sides of the felly, said means having cooperating elements, one of which may be manipulated to provide for the opening or the closure of said means.

17. A device for the attachment of anti-skid chains to wheels comprising a pair of clamp members for arrangement transversely over a spoke and together conforming thereto, said members having their ends connected together at the sides of the spoke and a chain link securement means carried by one of said members to sustain the pull of the anti-skid chain in opposite directions and arranged to overhang the felly and to lie between the adjacent spokes and inward of the sides of the felly, said means having cooperating elements, one of which may be manipulated to provide for the opening or the closure of said means.

18. A device for the attachment of anti-skid chains to wheels comprising a pair of clamp members for arrangement transversely over a spoke and together conforming thereto, said members having their ends connected together at the sides of the spokes and a chain link securement means carried by one of said members to sustain the pull of the anti-skid chain in opposite directions and arranged to overhang the felly and to lie between the adjacent spokes and inward of the sides of the felly, said securement means including a pair of opposed hooks disposed in a common plane transverse to the common plane of the spokes.

19. A device for the attachment of anti-skid chains to wheels comprising a pair of clamp members for arrangement transversely over a spoke and together conforming thereto, said members having their ends connected together at the sides of the spoke, and means constituted entirely by elements directly carried by one of said members between its end connections with the other member for the securement of the terminal links of the anti-skid chain and which sustains the pull of the anti-skid chain in opposite directions and is arranged to overhang the felly and to lie between the adjacent spokes and inward of the sides of the felly.

20. A device for securing chains consisting of a supporting plate for attachment to a relatively fixed object and provided with a pair of opposed hooks having their terminals in adjacency whereby to delimit an intervening space which provides a passage common to both links to be secured and a keeper supported by said plate and mounted for movement into said passage or wholly beyond said hooks to clear the terminals thereof.

21. A device for securing chains consisting of a supporting plate for attachment to a relatively fixed object and provided with a pair of opposed hooks having their terminals in adjacency whereby to delimit an intervening space which provides a passage common to both links to be secured, a keeper supported by said plate and mounted for movement into said passage or wholly beyond said hooks to clear the terminals thereof and means for fastening said keeper in its closed position.

22. A device for securing chains consisting of a supporting element provided with a pair of opposed hooks having their terminals in adjacency whereby to delimit an intervening space which provides a passage common to both links to be secured and a keeper pivoted to said element in overhanging relation to said hooks and movable in a plane at an angle to the common plane of the hook terminals to a position wherein it closes said passage and to another position wherein it is clear of the hooks and opens said passage.

23. A device for securing chains consisting of a supporting element provided with a pair of opposed hooks having their terminals in adjacency whereby to delimit an intervening space which provides a passage common to both links to be secured, a keeper pivoted to said element in overhanging relation to said hooks and movable in a plane at an angle to the common plane of the hook terminals to a position wherein it closes said passage and to another position wherein it is clear of the hooks and opens said passage, and means, including companion co-acting elements on said keeper and supporting element respectively, for fastening said keeper in its closed position.

24. A device for securing chains consisting of a supporting element provided with a pair of opposed hooks having their terminals in adjacency whereby to delimit an intervening space which provides a passage common to both links to be secured, a keeper pivoted for movement in a plane at an angle to the common plane of the hook terminals to a position wherein it closes said passage and to another position wherein it is clear of the hooks and opens said passage, said keeper having resilient catches at its free end, and opposite shoulders outstanding from said supporting element for engagement by said catches to fasten said keeper in closed position.

25. A device for securing chains consisting of a supporting element provided with a pair of opposed hooks having their terminals in adjacency whereby to delimit an intervening space which provides a passage common to both links to be secured, a keeper pivoted to said element for movement in a plane at an angle to the common plane of the hook terminals to a position wherein it closes said passage and to another position wherein it is clear of the hooks and opens said passage, and means, including companion coacting elements on said keeper and supporting element respectively, for fastening said keeper in its closed position, said keeper and supporting element being related whereby when the keeper is closed a clearance is afforded between the keeper and the adjacent part of said supporting element to which said keeper is pivoted and which is provided with a co-acting element of said fastening means.

26. A connecting device consisting of a base-plate adapted to be rigidly held in position on some relatively fixed object and provided with two hooks, the free ends of which are adjacent each other, in combination with a guard pivotally mounted on said plate and adapted to be turned on its pivot to lie between the adjacent free ends of said hooks to prevent the application or removal of a chain link to or from either of said hooks, and means for locking said guard in such position.

27. A latch consisting of a pivotally mounted sheet metal part of substantially U-shaped cross section having its greatest dimension in a direction taken radially of its pivot and having its side walls provided at the free end of said part and along their longer edges with resilient lips which are directed towards one another and are relatively long in the direction of said longer edges and relatively short in a direction at right angles to said longer edges in combination with a fixed lug having a maximum width greater than the normal distance between the longer edges of said lips, thereby to provide abutments of sensible length over which the lips resiliently engage when said part is moved to its operative position and to co-act with the lips in strongly securing said part in such position.

28. A latch consisting of a plate provided with a pair of spaced lugs and a sheet metal part of substantially U-shaped cross section having its greatest dimension in a direction taken radially of said pivot and having its side walls pivoted to one of said lugs at one end of said part and provided at the opposite free end of said part with resilient lips which are directed towards one another and are relatively long in the direction of said longer edges and relatively short in a direction at right angles to said longer edges, the other lug having securing co-operation with said lips and having a maximum width greater than the normal distance between the longer edges of said lips, thereby to provide abutments of sensible length over which the lips engage when said part is moved to its operative position and to co-act with the lips in strongly securing said part in such position, said part having an opening through which an implement may be inserted for manipulation against said part and said plate to move said part to its inoperative position against the resistance offered by the engagement of said lips with said last-named lug.

29. A latch consisting of a plate provided with a pair of spaced lugs and a sheet metal part of substantially U-shaped cross section having its greatest dimension in a direction taken radially of said pivot and having its side walls pivoted to one of said lugs at one end of said part and provided at the opposite free end of said part with resilient lips which are directed towards one another and are relatively long in the direction of said longer edges and relatively short in a direction at right angles to said longer edges, the other lug having securing co-operation with said lips and having a maximum width greater than the normal distance between the longer edges of said lips, thereby to provide abutments of sensible length over which the lips engage when said part is moved to its operative position and to co-act with the lips in strongly securing said part in such position, the side walls of said part having edge clearances between said lips and their pivot to provide an opening through which an implement may be inserted for manipulation against said part and said plate to move said part to its inoperative position against the resistance offered by the engagement of said lips with said last-named lugs.

In testimony whereof I have hereunto set my hand in presence of two subscribing witnesses.

TRUE M. AVERY.

Witnesses:
LEWIS A. JONES,
JOHN H. TERBY, Jr.